(12) United States Patent
Agrawal et al.

(10) Patent No.: US 12,709,969 B2
(45) Date of Patent: Aug. 18, 2026

(54) USING ELECTRICAL RESERVOIR STIMULATION TO ENGINEER A GEOLOGIC BATTERY FOR LONG-TERM ENERGY STORAGE AND HYDROGEN GENERATION

(71) Applicant: Eden GeoPower, Inc., Somerville, MA (US)

(72) Inventors: Vikas Agrawal, Medford, MA (US); Jacob Newmark, Somerville, MA (US); William Aertker, Denver, CO (US); Alexis Templeton, Boulder, CO (US); Rafael Villamor-Lora, Brookline, MA (US)

(73) Assignee: Eden GeoPower, Inc., Somerville, MA (US)

( * ) Notice: Subject to any disclaimer, the term of this patent is extended or adjusted under 35 U.S.C. 154(b) by 0 days.

(21) Appl. No.: 19/176,032

(22) Filed: Apr. 10, 2025

(65) Prior Publication Data

US 2025/0320803 A1 Oct. 16, 2025

Related U.S. Application Data

(60) Provisional application No. 63/632,715, filed on Apr. 11, 2024.

(51) Int. Cl.

*E21B 43/28* (2006.01)
*C01B 3/08* (2026.01)
*H02J 15/50* (2026.01)

(52) U.S. Cl.

CPC .............. *E21B 43/283* (2013.01); *C01B 3/08* (2013.01); *H02J 15/50* (2026.01)

(58) Field of Classification Search

CPC .... E21B 41/00; E21B 41/0085; E21B 43/283; H01M 14/00; H02J 15/008; C01B 3/08
See application file for complete search history.

(56) References Cited

U.S. PATENT DOCUMENTS 2,795,279 A * 6/1957 Sarapuu ................ E21B 43/247 166/57
3,103,975 A * 9/1963 Hanson ................... E21B 43/26 166/252.1

(Continued)

FOREIGN PATENT DOCUMENTS

CN 116062686 A * 5/2023 ............. C01B 3/105
JP 3192246 U * 8/2014
WO WO-2024102689 A1 * 5/2024 ............... C25B 9/23

*Primary Examiner* — Jennifer H Gay
(74) *Attorney, Agent, or Firm* — Wolf, Greenfield & Sacks, P.C.

(57) ABSTRACT

This disclosure describes systems and methods for using electrical stimulation of a rock formation (e.g., a subterranean formation, a subterranean reservoir) to improve, or otherwise enhance, the energy storage capabilities of the rock formation. Many existing rock formations are too impermeable to facilitate energy storage; however, the Inventors have recognized and appreciated that a "geobattery" may be constructed by using electrical stimulation to increase the permeability of a rock formation (e.g., a subterranean formation) such that water (or some other fluid) can be pumped into the rock formation, in particular, a reservoir within the rock formation, and converted into hydrogen to store the energy within the hydrogen.

29 Claims, 7 Drawing Sheets

(56) References Cited

U.S. PATENT DOCUMENTS

| | | | | | |
|---|---|---|---|---|---|
| 3,137,347 | A * | 6/1964 | Parker | E21B 43/2401 166/248 |
| 3,169,577 | A * | 2/1965 | Sarapuu | E21B 43/2401 166/308.1 |
| 3,211,220 | A * | 10/1965 | Sarapuu | E21B 43/2401 166/248 |
| 3,288,648 | A * | 11/1966 | Jones | H01M 8/00 429/442 |
| 4,046,194 | A * | 9/1977 | Cloud | E21B 43/17 166/248 |
| 4,084,638 | A * | 4/1978 | Whiting | E21B 43/003 166/302 |
| 4,135,579 | A * | 1/1979 | Rowland | E21B 43/2401 166/308.1 |
| 4,196,329 | A * | 4/1980 | Rowland | H05B 6/00 166/248 |
| 4,457,988 | A * | 7/1984 | Ryeczek | H01M 14/00 429/47 |
| 4,572,582 | A * | 2/1986 | Ryeczek | E21B 7/00 299/8 |
| 6,877,556 | B2 * | 4/2005 | Wittle | E21B 43/16 166/248 |
| 8,616,280 | B2 * | 12/2013 | Kaminsky | E21B 43/24 166/266 |
| 9,328,597 | B2 * | 5/2016 | Morys | E21B 43/2401 |
| 9,840,898 | B2 * | 12/2017 | Kasevich | E21B 43/006 |
| 11,091,991 | B1 | 8/2021 | Mehrvand et al. | |
| 11,506,027 | B1 * | 11/2022 | Sisk | E21B 41/0085 |
| 11,649,710 | B2 * | 5/2023 | Alali | E21B 43/2607 166/248 |
| 12,173,593 | B2 * | 12/2024 | Alali | E21B 17/028 |
| 2003/0102123 | A1 * | 6/2003 | Wittle | E21B 43/16 166/248 |
| 2011/0217581 | A1 * | 9/2011 | Styliaras | H02N 11/008 429/105 |
| 2012/0048544 | A1 * | 3/2012 | Kaminsky | E21B 43/24 166/272.1 |
| 2012/0256634 | A1 * | 10/2012 | Morys | E21B 43/25 324/338 |
| 2012/0325458 | A1 * | 12/2012 | El-Rabaa | C09K 8/80 166/248 |
| 2015/0167440 | A1 * | 6/2015 | Kasevich | E21B 7/15 166/52 |
| 2023/0020770 | A1 * | 1/2023 | Alali | E21B 43/26 |
| 2023/0085175 | A1 | 3/2023 | Smalls et al. | |
| 2024/0076964 | A1 * | 3/2024 | Foret | C25B 1/23 |
| 2024/0294374 | A1 * | 9/2024 | Lindberg | B01J 8/1836 |
| 2024/0294375 | A1 * | 9/2024 | Lindberg | E21B 41/00 |
| 2024/0294443 | A1 * | 9/2024 | Lindberg | B01J 23/892 |
| 2024/0426198 | A1 * | 12/2024 | Templeton | C01B 3/06 |

* cited by examiner

USING ELECTRICAL RESERVOIR STIMULATION TO ENGINEER A GEOLOGIC BATTERY FOR LONG-TERM ENERGY STORAGE AND HYDROGEN GENERATION

RELATED APPLICATIONS

This application claims priority under 35 U.S.C. § 119(e) to U.S. Provisional Application No. 63/632,715, filed Apr. 11, 2024, which is incorporated herein by reference in its entirety.

GOVERNMENT SPONSORSHIP

This invention was made with Government support under Contract No. DE-AR0001877 awarded by the U.S. Department of Energy. The Government has certain rights in the invention.

FIELD

Disclosed embodiments are related to systems and methods for electrohydraulic fracturing rock formations and subterranean features.

BACKGROUND

Energy storage persists as a challenge as efforts to reduce greenhouse gas emissions remain. Previous efforts include using geologic features for long-term energy storage. Several methods exist for long-duration energy storage; however, each has inherent limitations. For example, pumped-storage hydropower, constituting 90% of the US energy storage market, faces challenges like low energy density and susceptibility to drought impacts. Mechanical storage relying on gravity-based mediums incurs a high cost of approximately \$1800 $kWh^{-1}$. Other methods, such as compressed air energy storage, face limitations due to the need for large impermeable caverns, while thermal heat storage and power-to-gas storage methods encounter efficiency and cost issues. As another example, flow batteries, though offering extended storage durations and quick power discharge, have drawbacks such as low energy density and reliance on expensive fluids.

SUMMARY

In one aspect, a method for storing energy in a rock formation is described, the method comprising applying a first electrical potential across the rock formation and altering a redox state of a species within the rock formation in response to the first electrical potential.

In another aspect, a method for storing energy in a rock formation is described, the method comprising applying a first electrical potential across the rock formation, the rock formation comprising an iron species; altering a redox state of the iron species within the rock formation from a first state to a second state in response to the first electrical potential; injecting water to the rock formation; reacting water with the iron species within the rock formation to generate hydrogen; and altering the redox state of the iron species within the rock formation from the second state to the first state in response to reacting water with the iron species to generate hydrogen.

In another aspect, a system is described, the system comprising a power source; at least two electrodes connected to the power source; at least one pump; and at least one processor configured to operate the power source and the at least one pump to store and/or release energy from a rock formation.

BRIEF DESCRIPTION OF THE DRAWINGS

The accompanying drawings are not intended to be drawn to scale. In the drawings, each identical or nearly identical component that is illustrated in various figures may be represented by a like numeral. For purposes of clarity, not every component may be labeled in every drawing. In the drawings.

DETAILED DESCRIPTION

Figure 1A:
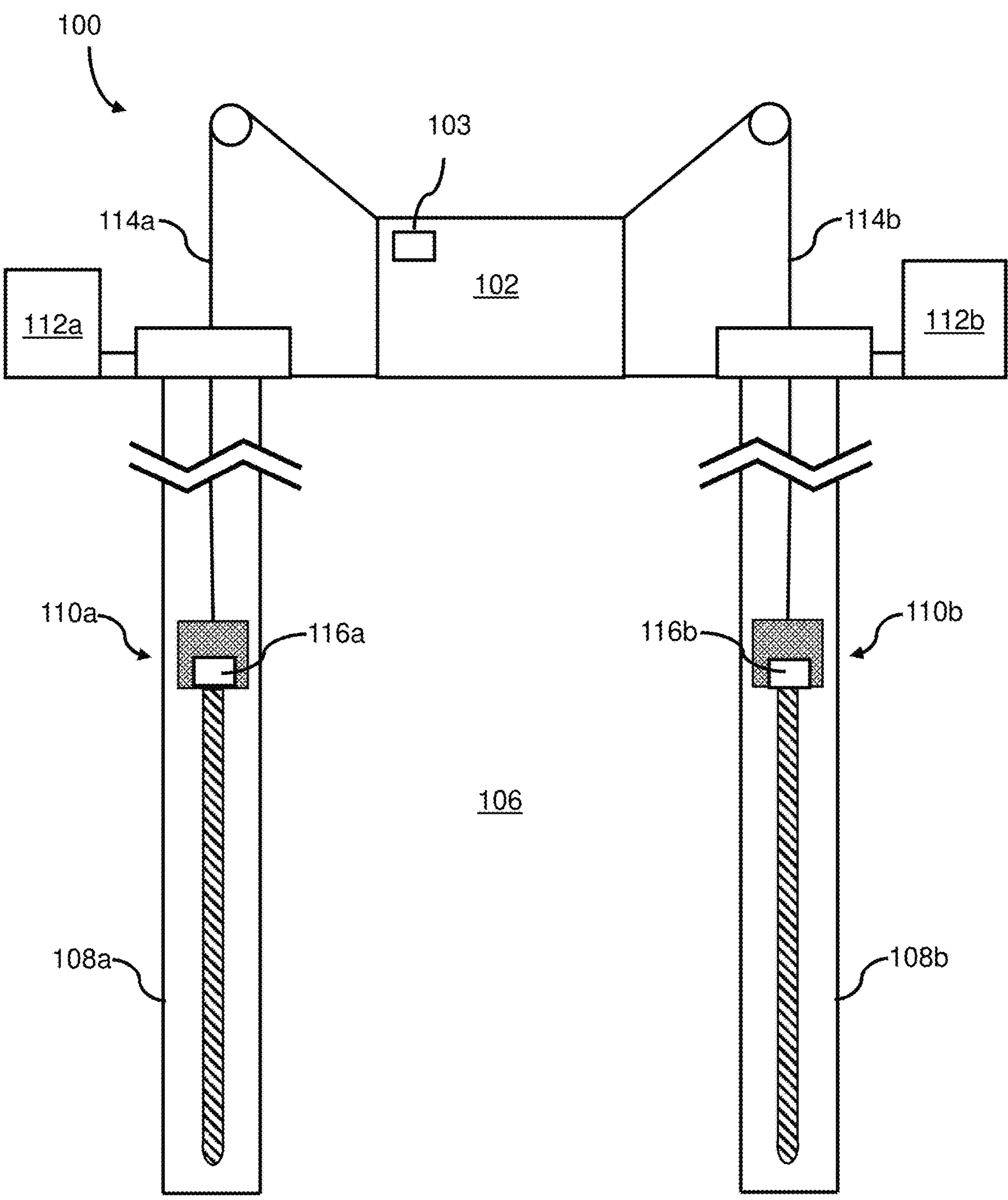
FIGS. 1A-1C depicts a system for fracturing using electrical stimulation, according to some embodiments.

The following disclosure describes systems and methods for using electrical stimulation of a rock formation (e.g., a subterranean formation, a subterranean reservoir) to improve, or otherwise enhance, the energy storage capabilities of the rock formation. Many existing rock formations are too impermeable to facilitate energy storage. However, the Inventors have recognized and appreciated that a "geo-battery" may be constructed by using electrical stimulation to increase the permeability of a rock formation (e.g., a subterranean formation) such that water (or some other fluid) can be pumped into the rock formation, in particular, a reservoir within the rock formation. The reservoir may contain a species capable of having its oxidation-reduction state (i.e., redox state) altered by the application of an electrical potential across the reservoir. In such an embodiment, the reservoir comprises a redox-active species (e.g., $Fe^{2+}/Fe^{3+}$; $Zn/Zn^{2+}$) that can be reversible oxidized and/or reduced, such that the reservoir can function as a receptacle to store energy in the subterranean formation. For example, water can be pumped into the reservoir to generate hydrogen while oxidizing $Fe^{2+}$ to $Fe^{3+}$; the generated hydrogen may then be extracted as a gas and/or dissolved within a liquid that is extracted from the reservoir through a fluidly connected well; the formation may then be reduced through the application of an appropriate voltage (e.g., $Fe^{3+}$ to $Fe^{2+}$ or some other redox-active species) to permit cyclic energy storage and hydrogen generation.

In the case of $Fe^{2+}/Fe^{3+}$ redox species, the process of generating geologic hydrogen from Fe(II)-bearing formations via water reduction is understood as follows:

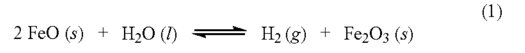

$$2\,FeO\,(s) + H_2O\,(l) \rightleftharpoons H_2\,(g) + Fe_2O_3\,(s) \quad (1)$$

The described redox cycling using electrical reservoir stimulation (ERS), chemical, and/or electrochemical treatment may help to store electrical energy in a mineral and/or aqueous form that can subsequently be converted to hydrogen as needed by a particular energy demand. It may also enhance the production rate and increase the total yield of geologic hydrogen from various geological formations. Advantageously, the systems and methods described here can (i) provide a more efficient power-to-gas method and long-duration energy storage form compared to the current state-of-the-art electrolysis and hydrogen storage; (ii) promoting iron-redox cycles to utilize the same iron-rich geologic formations continuously for energy storage and production; and (iii) mitigating hydrogen storage requirements since the iron formation stores electrons to release energy as hydrogen from spontaneous hydrogen-producing reactions. And while various embodiments described using iron (e.g., $Fe^{2+}/Fe^{3+}$ and $H^+/H_2^0$), it should be understood that other redox-active species including, for example, zinc and aluminum (e.g., $Zn/Zn^{2+}$; $Al/Al^{3+}$), are possible, as this disclosure is not so limited. And, in some embodiments, while the reactions to store and/or release energy occurs via a solid-state reaction, solution phase reactions (e.g., aqueous phase reactions) are also possible and described in more detail below.

Various embodiments described herein involve electrically altering and/or fracturing a rock formation (e.g., a subterranean formation) by injecting a fluid (e.g., a fracturing fluid, a transport fluid) into the subterranean formation and applying an electrical potential across the subterranean formation and/or the fluid. Without wishing to be bound by any particular theory, it is believed that the application of an electrical potential across the fluid within the subterranean fluid results in rapid Joule heating of the fluid and/or the subterranean formation, which may promote fracturing of the subterranean formation. In some embodiment, water (e.g., water of a lower temperature than the formation) is injected into the formation after Joule heating to facilitate rapid contraction which may result in enhanced and/or further fracturing of the formation. Joule heating is described in more detail below and elsewhere herein. It is also believed that applying a lower electrical potential may cause a species within a rock formation to change its oxidation state.

In some embodiments, a fluid is injected into a rock formation prior to fracturing (e.g., a subterranean formation). In some such embodiments, the fluid promotes fracturing of the rock formation, and hence is a fracturing fluid. In some such embodiments, the fluid may transport materials helpful for promoting fracturing of the rock formation, such as proppants (e.g., conductive and/or non-conductive proppants), which can help form or maintain fractures within the rock formation. A variety of fluids may be used as a fracturing fluid and/or transport fluid. Non-limiting examples include water (e.g., freshwater), brines (i.e., aqueous solutions with excess salt(s)) and/or compressed gas (e.g., liquefied petroleum gas and/or other appropriate compressed gases).

In some embodiments, energy storage is cyclic, in that a redox state of a species within a rock formation can be altered (e.g., from 3+ to 2+), the altered redox states of the species use to react with another reactant (e.g., water) while cycling the altered redox state to the original redox state (e.g., from 2+ to 3+), where the original redox state can go through the same (or similar) cycle.

In some embodiments, a transport fluid is present at a particular amount within a hydraulic fracturing composition. In some embodiments, the transport fluid is greater than or equal to 10 wt %, greater than or equal to 20 wt %, greater than or equal to 30 wt %, greater than or equal to 50 wt %, greater than or equal to 70 wt %, greater than or equal to 90 wt %, greater than or equal to 95 wt %, or greater than or equal to 99 wt % of the total weight of the hydraulic fracturing composition. In some embodiments, the transport fluid is less than or equal to 99 wt %, less than or equal to 95 wt %, less than or equal to 90 wt %, less than or equal to 70 wt %, less than or equal to 50 wt %, less than or equal to 30 wt %, less than or equal to 20 wt %, or less than or equal to 10 wt % of the total weight of the hydraulic fracturing composition. Combinations of the foregoing ranges are also possible (e.g., greater than or equal to 10 wt % and less than or equal to 99 wt %). Other ranges are possible. The remaining portions of the hydraulic fracturing composition may be other components (e.g., additives, proppants). Other components are described elsewhere herein.

To facilitate electrohydraulic fracturing and/or heating (e.g., Joule heating) of a subterranean formation, a fluid injected into a well (e.g., a hydraulic fracturing fluid) may have a particular electrical conductivity. In some embodiments, the electrical conductivity of the fluid is greater than or equal to 100 μS/cm, greater than or equal to 200 μS/cm, greater than or equal to 500 μS/cm, greater than or equal to 1,000 μS/cm, greater than or equal to 5,000 μS/cm, greater than or equal to 10,000 μS/cm, greater than or equal to 50,000 μS/cm, or greater than or equal to 100,000 μS/cm. In some embodiments, the electrical conductivity of the fluid is less than or equal to 100,000 μS/cm, less than or equal to 50,000 μS/cm, less than or equal to 10,000 μS/cm, less than or equal to 5,000 μS/cm, less than or equal to 1,000 μS/cm, less than or equal to 500 μS/cm, less than or equal to 200 μS/cm, or less than or equal to 100 μS/cm. Combinations of the foregoing ranges are also possible (e.g., greater than or equal to 100 μS/cm and less than or equal to 100,000 μS/cm). Other ranges are possible as this disclosure is not so limited.

In some embodiments, the subterranean formation comprises one or more rock types or minerals. For example, a subterranean formation is or comprises a peridotite, iron-rich, olivine-rich, mafic, ultramafic, skarn, iron-rich metasomatic rock, layered mafic intrusion, and/or massive sulfide (e.g., greater than or equal to 60 wt % sulfides) rock formations. Additional non-limiting examples rock types or minerals include felsic rocks, silicic rocks, mafic rocks, ultramafic rocks, porphyry deposits, both high and low sulfidation epithermal deposits, skarn deposits, orogenic gold deposits, quartzite, sandstone, metapelites, metabasites, rhyolite, dacite syenite, monzonite, bauxite, banded iron formations, laterites, taconites, and granite. Further non-limiting examples of rock types include iron-oxide-copper-gold deposits, as well as pyrite-rich sedimentary rocks, including shale and coal, as well as Zn ore deposits, which include sedimentary exhalative, Mississippi-Valley Type (MVT), and volcanogenic massive sulfide deposits. Other rock formations are possible as this disclosure is not so limited.

In some embodiments, a subterranean formation that generates geologic hydrogen has relatively high amounts of iron. In some embodiments, an iron-rich rock formation includes iron at a weight percentage of between or equal to 1 wt % to 68 wt % (e.g., greater than or equal to 1 wt %, greater than or equal to 4 wt %, greater than or equal to 5 wt %, greater than or equal to 10 wt %, greater than or equal to 20 wt %, greater than or equal to 50 wt %, greater than or equal to 68 wt %, less than or equal to 50 wt %, less than or equal to 20 wt %, less than or equal to 10 wt %, less than or equal to 5 wt %, less than or equal to 4 wt %; combinations are possible). Non-limiting examples of iron-rich rock formations include minerals such as hematite, iron hydroxide, goethite, magnetite, greenalite, ankerite, siderite, pyrite, limonite, pyroxene, spinel, serpentine, pyroxene, pyrrhotite, specularite, cordierite and/or olivine. Other iron-rich rock formations are possible.

In some embodiments, a subterranean formation that generates geologic hydrogen has relatively low amounts of silicon (e.g., Si) or a silicon-containing compound (e.g., $SiO_2$). In some embodiments, a silicon-rich rock formation includes silicon at a weight percentage of between or equal to 1 wt % to 10 wt % (e.g., greater than or equal to 1 wt %, greater than or equal to 4 wt %, greater than or equal to 5 wt %, or greater than or equal to 10 wt %; less than or equal to 10 wt %, less than or equal to 5 wt %, less than or equal to 4 wt %; combinations are possible).

Some embodiments are particularly suited for fracturing relatively hard subterranean formations. For example, in some embodiments, the hardness of the subterranean formation is between or equal to 2 on the Mohs scale and 8 on the Mohs scale (e.g., greater than or equal to 2, greater than or equal to 4, greater than or equal to 6, greater than or equal to 8; less than or equal to 8, less than or equal to 6, less than or equal to 4; combinations are possible).

In some embodiments, a fluid comprises additives, such as proppants, to facilitate fracturing. Non-limiting examples of proppants include alumina ($Al_2O_3$), silica ($SiO_2$), and/or polymers, such as copolymers (e.g., resin $C_{21}H_{25}ClO_5$).

In some embodiments, a fluid comprises additives, such as a chelating agent(s) and/or lixiviants. Non-limiting examples of chelating agents and/or lixiviants include organic acids, such as acetic acid, citric acid and/or oxalic acid, ethylenediaminetetraacetic acid (EDTA). Other chelating agents are possible. Advantageously, the chelating agent (s) may facilitate aqueous reactions of the species and/or the activated species.

In some embodiments, the fluid (e.g., a transport fluid, a fracturing fluid) comprises a conductive proppant. Non-limiting examples of conductive proppant include ceramic particles (e.g., electrically conductive ceramic particles), coated particles (e.g., particles coated with a conductive material such as a conductive metal or other conductive material, conductive composite particles where the composite particles include a non-conductive and conductive material), copolymers and resin, carbon particles (e.g., carbon black, acetylene black, petroleum coke, graphite), and metal particles (e.g., stainless steel shot). Additional non-limiting examples of conductive proppants include porous or sintered metals, such as aluminum or aluminum alloys. Combinations of these additives are also possible (e.g., petroleum coke and another proppant, coated particle and/or uncoated particles). Other conductive proppants are possible.

In some embodiments, an additive (e.g., a proppant) is present within the fluid (e.g., a fracturing fluid, a transport fluid) at a particular amount or concentration. In some embodiments, a weight percentage of additive within the fluid is greater than or equal to 1 wt %, greater than or equal to 2 wt %, greater than or equal to 3 wt %, greater than or equal to 5 wt %, greater than or equal to 10 wt %, greater than or equal to 15 wt %, greater than or equal to 20 wt %, greater than or equal to 25 wt %, greater than or equal to 30 wt %, greater than or equal to 40 wt %, greater than or equal to 50 wt %, or greater than or equal to 60 wt %. In some embodiments, a weight percentage of additive within the fluid is less than or equal to 60 wt %, less than or equal to 50 wt %, less than or equal to 40 wt %, less than or equal to 30 wt %, less than or equal to 25 wt %, less than or equal to 20 wt %, less than or equal to 15 wt %, less than or equal to 10 wt %, less than or equal to 5 wt %, less than or equal to 3 wt %, less than or equal to 2 wt %, or less than or equal to 1 wt %. Combinations of the foregoing ranges also possible (e.g., greater than or equal to 1 wt % and less than or equal to 60 wt %). Of course, other ranges are possible as this disclosure is not so limited.

An additive (e.g., a proppant, a chelating agent) to the fluid (e.g., a fracturing fluid, a transport fluid) may have a particular size or dimension. In some embodiments, an average maximum transverse dimension of an additive is greater than or equal to 100 μm, greater than or equal to 200 μm, greater than or equal to 300 μm, greater than or equal to 400 μm, greater than or equal to 500 μm, greater than or equal to 600 μm, greater than or equal to 700 μm, greater than or equal to 800 μm, greater than or equal to 900 μm, greater than or equal to 1,000 μm, greater than or equal to 2 mm, or greater than or equal to 3 mm. In some embodiments, an average maximum transverse dimension of an additive is less than or equal to 3 mm, less than or equal to 2 mm, less than or equal to 1,000 μm, less than or equal to 900 μm, less than or equal to 800 μm, less than or equal to 700 μm, less than or equal to 600 μm, less than or equal to 500 μm, less than or equal to 400 μm, less than or equal to 300 μm, less than or equal to 200 μm, or less than or equal to 100 μm. Combinations of the foregoing ranges are also possible (e.g., greater than or equal to 100 μm and less than or equal to 3 mm). Other ranges are possible.

In some embodiments, an additive (e.g., a proppant) within a fluid (e.g., a transport fluid, a fracturing fluid) may include a plurality of porous particles with a particular average porosity. In some embodiments, the average porosity of the additive particles is greater than or equal to 10%, greater than or equal to 15%, greater than or equal to 20%, greater than or equal to 25%, greater than or equal to 30%, greater than or equal to 40%, greater than or equal to 50%, greater than or equal to 60%, or greater than or equal to 70%. In some embodiments, the average porosity of the additive particles is of less than or equal to 70%, less than or equal to 60%, less than or equal to 50%, less than or equal to 40%, less than or equal to 30%, less than or equal to 25%, less than or equal to 20%, less than or equal to 15%, or less than or equal to 10%. Combinations of the foregoing ranges are also possible (e.g., greater than or equal to 10% and less than or equal to 70%). Other ranges are possible.

In some embodiments, an additive (e.g., a proppant) of a fluid (e.g., a fracturing fluid, a transport fluid) has a particular average pore size. In some embodiments, the additive has an average pore diameter of greater than or equal to 50 nm, greater than or equal to 100 nm, greater than or equal to 200 nm, greater than or equal to 250 nm, greater than or equal to 500 nm, greater than or equal to 750 nm, greater than or equal to 1 μm, greater than or equal to 5 μm, greater than or equal to 10 μm, greater than or equal to 20 μm, greater than or equal to 25 μm, greater than or equal to 50 μm, greater than or equal to 100 μm, greater than or equal to 250 μm, greater than or equal to 500 μm, greater than or equal to 750 μm, or greater than or equal to 1,000 μm. In some embodiment, the additive has an average pore diameter of less than or equal to 1,000 μm, less than or equal to 750 μm, less than or equal to 500 μm, less than or equal to 250 μm, less than or equal to 100 μm, less than or equal to 50 μm, less than or equal to 25 μm, less than or equal to 20 μm, less than or equal to 10 μm, less than or equal to 5 μm, less than or equal to 1 μm, less than or equal to 750 nm, less than or equal to 500 nm, less than or equal to 250 nm, less than or equal to 100 nm, or less than or equal to 50 nm. Combinations of the foregoing ranges are also possible (e.g., greater than or equal to 50 nm and less than or equal to 1,000 μm). Other ranges are possible as this disclosure is not so limited.

Geologic hydrogen can be extracted from subterranean formations with relatively low permeability. In some embodiments, a permeability of a subterranean formation prior to electrohydraulic fracturing may be less than or equal to $10^{-20}$ $m^2$. In some embodiments, the permeability of a subterranean formation may exhibit an increase in permeability of at least 2, 10, 100, or other appropriate multiple increase in permeability after electrohydraulic fracturing. In some instances, the increase in permeability may be less than 1000, 100, or other appropriate multiple of the original permeability of the formation. For example, a formation may exhibit an increase in permeability between or equal to 2 and 1000 times the original permeability, though other potential increases are possible. In some embodiments, the permeability of a formation capable of generating hydrogen after electrohydraulic fracturing may be between or equal to $10^{-18}$ $m^2$ and $10^{-7}$ $m^2$ (e.g., greater than or equal to $10^{-18}$ $m^2$, greater than or equal to $10^{-17}$ $m^2$, greater than or equal to $10^{-16}$ $m^2$, greater than or equal to $10^{-15}$ $m^2$, greater than or equal to $10^{-14}$ $m^2$, greater than or equal to $10^{-13}$ $m^2$, greater than or equal to $10^{-12}$, greater than or equal to $10^{-11}$ $m^2$, greater than or equal to $10^{-10}$ $m^2$, greater than or equal to $10^{-9}$ $m^2$, greater than or equal to $10^{-8}$ $m^2$, greater than or equal to $10^{-7}$ $m^2$; less than or equal to $10^{-7}$ $m^2$, less than or equal to $10^{-8}$ $m^2$, less than or equal to $10^{-9}$ $m^2$, less than or equal to $10^{-10}$ $m^2$, less than or equal to $10^{-11}$ $m^2$, less than or equal to $10^{-12}$ $m^2$, less than or equal to $10^{-13}$ $m^2$, less than or equal to $10^{-14}$ $m^2$, less than or equal to $10^{-15}$ $m^2$, less than or equal to $10^{-16}$ $m^2$, less than or equal to $10^{-17}$ $m^2$, less than or equal to $10^{-18}$ $m^2$; combinations are possible).

Electrohydraulically fracturing a subterranean formation may enhance the permeability of the subterranean formation. For example, in some embodiments, a permeability of a subterranean formation prior to electrohydraulic fracturing may be less than or equal to $10^{-20}$ $m^2$. In some embodiments, the permeability of a subterranean formation (e.g., after electrical stimulation) may exhibit an increase in permeability of at least 2, 10, 100, or other appropriate multiple increase in permeability after electrohydraulic fracturing. In some instances, the increase in permeability may be less than 1000, 100, or other appropriate multiple of the original permeability of the formation. For example, a formation may exhibit an increase in permeability between or equal to 2 and 1000 times the original permeability, though other potential increases are possible.

In some embodiments, the permeability of a subterranean formation after electrohydraulic fracturing may be between or equal to $10^{-18}$ $m^2$ and $10^{-7}$ $m^2$ (e.g., greater than or equal to $10^{-18}$ $m^2$, greater than or equal to $10^{-17}$ $m^2$, greater than or equal to $10^{-16}$ $m^2$, greater than or equal to $10^{-15}$ $m^2$, greater than or equal to $10^{-14}$ $m^2$, greater than or equal to $10^{-13}$ $m^2$, greater than or equal to $10^{-12}$, greater than or equal to $10^{-11}$ $m^2$, greater than or equal to $10^{-10}$ $m^2$, greater than or equal to $10^{-9}$ $m^2$, greater than or equal to $10^{-8}$ $m^2$, greater than or equal to $10^{-7}$ $m^2$; less than or equal to $10^{-7}$ $m^2$, less than or equal to $10^{-8}$ $m^2$, less than or equal to $10^{-9}$ $m^2$, less than or equal to $10^{-10}$ $m^2$, less than or equal to $10^{-11}$ $m^2$, less than or equal to $10^{-12}$ $m^2$, less than or equal to $10^{-13}$ $m^2$, less than or equal to $10^{-14}$ $m^2$, less than or equal to $10^{-15}$ $m^2$, less than or equal to $10^{-16}$ $m^2$, less than or equal to $10^{-17}$ $m^2$, less than or equal to $10^{-18}$ $m^2$; combinations are possible).

In some such embodiments, a hydraulic fracturing system comprises one or more pumps configured to inject the hydraulic fracturing composition into the reservoir, where the hydraulic fracturing composition comprises a transport fluid and a conductive proppant. The system may also include, two or more electrodes positioned in two or more spaced apart bore holes configured to apply a potential across at least a portion of the reservoir and/or a proppant reservoir containing the hydraulic fracturing composition, where the proppant reservoir is in fluidic communication with the hydraulic fracturing pump.

When injecting a fluid (e.g., a fracturing fluid, a transport fluid) into a rock formation (e.g., a subterranean formation), the rock formation and/or the surrounding well environment may be under relatively high pressures. In some embodiments, a well environment may be associated with a pressure of greater than or equal to 1 megapascals (MPa), 5 MPa, 10 MPa, 25 MPa, 50 MPa, 100 MPa, or other appropriate pressure. In some embodiments, a well environment may be associated with a pressure of less than or equal to 150 MPa, 100 MPa, 50 MPa, 25 MPa, 10 MPa, less than or equal to 5 MPa, less than or equal to 1 MPa, or other appropriate pressure. Combinations of the above are contemplated including, for example, a pressure between about 5 MPa and 150 MPa. However, pressure ranges both greater than and less than those noted above are also contemplated.

As described above and elsewhere herein, various embodiments include electrically fracturing a rock formation (e.g., a subterranean formation) to facilitate the extraction of geologic hydrogen. In some embodiments, electricity is provided to the rock formation via direct or alternating current (e.g., a DC or an AC current from a power source). In some embodiments, the direct or alternating current has a voltage of greater than or equal to 50 V, greater than or equal to 100 V, greater than or equal to 500 V, greater than or equal to 1 kV, greater than or equal to 5 kV, greater than or equal to 10 kV, greater than or equal to 50 kV, greater than or equal to 100 kV, or greater than or equal to 200 kV. In some embodiments, the direct or alternating current has a voltage of less than 200 kV, less than or equal to 100 kV, less than or equal to 50 kV, less than or equal to 10 kV, less than or equal to 5 kV, less than or equal to 1 kV, less than or equal to 500 V, less than or equal to 100 V, or less than or equal to 50 V. Combinations of the foregoing ranges are also possible (e.g., greater than or equal to 50 V and less than or equal to 100 kV). In another embodiment, the voltage may be between or equal to 1 kV and 100 kV. Other ranges are possible as this disclosure is not so limited.

In some embodiments, a DC or an AC power device provides an electric current to the rock formation (e.g., via two or more electrodes) with a particular amount of power. In some embodiments, the electric current has a power of greater than or equal to 1 MW, greater than or equal to 5 MW, greater than or equal to 10 MW, greater than or equal to 50 MW, greater than or equal to 100 MW, greater than or equal to 500 MW, or greater than or equal to 1,000 MW. In some embodiments, the electric current has a power of less than or equal to 1,000 MW, less than or equal to 500 MW, less than or equal to 100 MW, less than or equal to 50 MW, less than or equal to 10 MW, less than or equal to 5 MW, or less than or equal to 1 MW. Combinations of the above-referenced ranges are also possible (e.g., greater than or equal to 1 MW and less than or equal to 1,000 MW). Of course, other ranges are possible as this disclosure is not so limited.

In some embodiments, an electric pulse can be administered via a pulsed power device with a particular voltage. In some embodiments, the electric pulse has a peak voltage of greater than or equal to 50 V, greater than or equal to 100 V, greater than or equal to 500 V, greater than or equal to 1 kV, greater than or equal to 5 kV, greater than or equal to 10 kV, greater than or equal to 50 kV, greater than or equal to 100 kV, greater than or equal to 300 kV, greater than or equal to 500 kV, greater than or equal to 700 kV, greater than or equal to 800 kV, greater than or equal to 1 MV, greater than or equal to 10 MV, or greater than or equal to 100 MV. In some embodiments, the electric pulse has a peak voltage of less than or equal to 100 MV, less than or equal to 10 MV, less than or equal to 1 MV, less than or equal to 800 kV, less than or equal to 700 kV, less than or equal to 500 kV, less than or equal to 300 kV, less than or equal to 100 kV, less than or equal to 50 kV, less than or equal to 10 kV, less than or equal to 5 kV, less than or equal to 1 kV, less than or equal to 500 V, less than or equal to 100 V, or less than or equal to 50 V. Combinations of the foregoing ranges are also possible (e.g., greater than or equal to 50 V and less than or equal to 100 kV). In another embodiment, the peak voltage may be between or equal to 1 kV and 100 kV. Other ranges are possible as this disclosure is not so limited.

In some embodiments, a pulse power device administers an electric pulse with a particular amount of energy. In some embodiments, an electric pulse is delivered with greater than or equal to 1 kJ/pulse, greater than or equal to 5 kJ/pulse, greater than or equal to 10 kJ/pulse, greater than or equal to 25 kJ/pulse, greater than or equal to 50 kJ/pulse, greater than or equal to 75 kJ/pulse, greater than or equal to 100 kJ/pulse, or greater than or equal to 250 kJ/pulse, or greater than or equal to 500 kJ/pulse. In some embodiments, an electric pulse is delivered with less than or equal to 500 kJ/pulse, less than or equal to 250 kJ/pulse, less than or equal to 100 kJ/pulse, less than or equal to 75 kJ/pulse, less than or equal to 50 kJ/pulse, less than or equal to 25 kJ/pulse, less than or equal to 10 kJ/pulse, less than or equal to 5 kJ/pulse, or less than or equal to 1 kJ/pulse. Combinations of the foregoing ranges are also possible (e.g., greater than or equal to 1 kJ/pulse and less than or equal to 100 kJ/pulse). Other ranges are possible as this disclosure is not so limited.

In some embodiments, a pulse power device administers an electric pulse with a particular amount of power. In some embodiments, the electric pulse has a peak power of greater than or equal to 1 W, greater than or equal to 1 kW, greater than or equal to 1 MW, greater than or equal to 5 MW, greater than or equal to 10 MW, greater than or equal to 50 MW, greater than or equal to 100 MW, greater than or equal to 500 MW, or greater than or equal to 1,000 MW. In some embodiments, the electric pulse has a peak power of less than or equal to 1,000 MW, less than or equal to 500 MW, less than or equal to 100 MW, less than or equal to 50 MW, less than or equal to 10 MW, less than or equal to 5 MW, less than or equal to 1 MW, less than or equal to 1 kW, or less than or equal to 1 W. Combinations of the above-referenced ranges are also possible (e.g., greater than or equal to 1 MW and less than or equal to 1,000 MW). Of course, other ranges are possible as this disclosure is not so limited.

It should be appreciated that a power source may be configured to generate (and/or a high voltage cable may be configured to accommodate) electricity of any suitable current, as the disclosure is not limited in this regard. In some embodiments, the power source may be configured to generate a peak current of greater than or equal to 10 amperes (A), 20 A, 50 A, 100 A, 250 A, 500 A, 1 kA, 10 kA, 100 kA, or 500 kA. In some embodiments, the power source may be configured to generate a peak current of less than or equal to 500 kA, 100 kA, 10 kA, 1 kA, 500 A, 250 A, 100 A, 50 A, or 20 A. Typical operating ranges may include currents in the range of 10-80 A. However, current ranges both greater than and less than those noted above are also contemplated.

In some embodiment, AC and/or pulse power is supplied with a particular frequency. In some embodiments, the frequency is greater than or equal to 0.001 Hz, greater than or equal to 0.1 Hz, greater than or equal to 1 Hz, greater than or equal to 10 Hz, greater than or equal to 50 Hz, greater than or equal to 100 Hz, greater than or equal to 500 Hz, greater than or equal to 1 kHz, greater than or equal to 50 kHz, greater than or equal to 100 kHz, greater than or equal to 500 kHz, or greater than or equal to 1 MHz. In some embodiments, the frequency is less than 1 MHz, less than 500 kHz, less than or equal to 100 kHz, less than or equal to 1 kHz, less than or equal to 500 kHz, less than or equal to 100 kHz, less than or equal to 50 kHz, less than or equal to 1 kHz, or equal to 1 Hz, less than or equal to 0.1 Hz, or less than or equal to 0.001 Hz. Combinations of the foregoing range are also possible (e.g., greater than or equal to 0.001 Hz and less than or equal to 1 M Hz). Other ranges are possible as this disclosure is not so limited.

One or more electrodes (e.g., two electrodes) may be used to electrically stimulate a fracture. The one or more electrodes are operatively associated with one or more power sources to provide power, as described above. In some embodiments, the one or more electrodes are configured to apply an electrical potential (i.e., voltage) between or adjacent to a first portion of the reservoir and a second portion of the reservoir. In some such embodiments, the applied electrical potential heats the reservoir (e.g., via Joule heating) due to the flow of current between the electrodes and through the formation and/or a fluid (e.g., a fracturing fluid) within the formation. Non-limiting examples of appropriate electrodes may include titanium, aluminum, copper, and alloys and/or compounds thereof. Additional non-limiting examples of appropriate electrodes include copper, graphite, nickel, gold, and/or platinum or their alloys. Other electrode materials are possible. In some embodiments, the electrodes used for fracturing a subterranean formation may be different in construction and/or material as compared to the electrodes used for changing the redox state of a species located within the formation. Of course, embodiments in which the same electrodes are used to perform both are also contemplated.

It will be understood that the one or more electrodes need not be in direct contact with the rock formation. For example, the one or more electrodes may be in contact with a fracture in fluidic communication a portion of the rock formation (e.g., a reservoir within the rock formation), and the electrode(s) may provide energy to the fracture (e.g., a fluid within the fracture and/or in fluidic communication with the reservoir). Thus, electrohydraulic fracturing and/or heating of the reservoir may be conducted even without direct contact with a portion of a subterranean formation, including a composition appropriate for forming geologic hydrogen.

As noted elsewhere herein and described in more detail below, electrical stimulation of a fluid (e.g., a transport fluid, a fracturing fluid) within a rock formation (e.g., a subterranean formation) and/or the rock formation itself can also be used, in some embodiments, to control or maintain the temperature of the rock formation, e.g., by heating the rock formation via Joule heating, where a current is passed through the reservoir and/or a fluid within the reservoir. Joule heating describes the generation of heat by passing of current through an electrically conductive medium to produce thermal energy, providing heat to the surroundings.

Advantageously, the increased temperature of the rock formation facilitated by Joule heating may promote fracturing by expansion (and/or contraction) of portions of rock formation. As another advantage, certain reactions are more favorable at certain temperatures, so heating the rock formation may provide temperatures more suitable those certain reactions (e.g., hydrogen production). Thus, as described in more detail elsewhere herein, electrical stimulation may not only promote additional fracturing of a rock formation via expansion and/or contraction, it may also promote certain reactions to occur more readily. Those certain reactions may generate desirable products (e.g., hydrogen) that can be subsequently extracted.

Systems and methods described herein may provide heat and/or maintain a temperature of a rock formation (e.g., a subterranean formation, a reservoir within a subterranean formation). For example, in some embodiments, the temperature of the rock formation is maintained such that fluid remains in a liquid state. In some embodiments, electrically stimulating a rock formation comprises heating at least a portion of the reservoir by greater than or equal to 1° C., greater than or equal to 2° C., greater than or equal to 5° C., greater than or equal to 10° C., greater than or equal to 50° C., greater than or equal to 100° C., greater than or equal to 200° C., greater than or equal to 300° C., greater than or equal to 400° C., or other appropriate temperature relative to a temperature of the reservoir prior to electrically heating the reservoir. The temperature of the rock formation may also be heated by less than or equal to 400° C., 300° C., 200° C., or other appropriate temperature. Combinations of the above are contemplated including heating a temperature of a formation by between 100° C. and 400° C. relative to a temperature of the rock formation. Other temperatures relative to a temperature of the rock formation prior to injecting the fluid (e.g., a fracturing fluid, a transport fluid) are also possible.

As previously noted, in some embodiments, it is desirable to control a temperature of a rock formation (e.g., subterranean formation). In such an embodiment, a temperature, or other parameter related to the rock formation, can be sensed by one or more sensors, for example, positioned downhole within a well formed in the rock formation. The one or more sensors may either be separate from or connected to, for example, a downhole electrode(s) used to apply electrical potentials to the rock formation. In either case, the one or more sensors may sense one or more parameters. Appropriate parameters may include, but are not limited to temperature, pressure, gas composition, and/or other appropriate parameters. The operation of one or more electrodes may then be controlled based on the sensed one or more parameters. For example, in instances where it is desirable to control a temperature of the rock formation, the current, electrical potential, power, and/or other operating parameter applied by the one or more electrodes may be controlled to maintain a temperature of the rock formation to be within a predetermined range of temperatures, as described in more detail elsewhere herein. One or more electrodes may be used to continuously dissipate electric energy as heat (e.g., via Joule heating) through the rock formations and/or fluid within the pores of the rock formation. In some such embodiments, both DC and AC (or a combined DC/AC) stimulation may be used. The electric current can heat the reservoir with power proportional to both voltage and current.

As described elsewhere herein, energy may be stored in the form of hydrogen. In some embodiments, the amount of hydrogen stored is greater than 0.0001 nanomoles $H_2$/gram rock and less than or equal to 10,000 nanomoles $H_2$/gram rock (e.g., greater than or equal to 0.0001 nanomoles $H_2$/gram rock, greater than or equal to 0.01 nanomoles $H_2$/gram rock, greater than or equal to 1 nanomoles $H_2$/gram rock, greater than or equal to 100 nanomoles $H_2$/gram rock, greater than or equal to 10,000 nanomoles $H_2$/gram rock; less than or equal to 10,000 nanomoles $H_2$/gram rock, less than or equal to 100 nanomoles $H_2$/gram rock, less than or equal to 1 nanomoles $H_2$/gram rock, less than or equal to 0.01 nanomoles $H_2$/gram rock, less than or equal to 0.0001 nanomoles $H_2$/gram rock; combinations of these ranges are possible). Other ranges are possible as this disclosure is not so limited.

While many of the embodiments disclosed herein are primarily described relative to rock formations (e.g., subterranean formations), in some embodiments, rock tailings may be used to generate or extract resources (e.g., hydrogen). These rock tailings may comprise compositions corresponding to any of the noted rock formations described herein. The rock tailings may be exposed to water and/or exposed to appropriate temperatures and/or pressures, as noted above, using any appropriate arrangement. For example, in some embodiments, rock tailings are disposed in a reaction container, disposed within a retention bath, or otherwise arranged such that the rock tailings may be exposed to water. One or more electrodes may also be disposed in, or otherwise placed in electrical communication with the rock tailings to control an electrical potential applied across the rock tailings using any of the methods disclosed herein relative to a rock formation. In the instance of rock tailings in a reactor, the reactor may include electrodes in electrical contact with an interior volume of the reactor, or a fluid within the interior volume. In instances where the rock tailings are disposed in a larger retention bath, or other location where the rock tailings may be exposed to water (e.g., a pile of rock tailings with a water feed associated with the pile), the electrodes may be driven into, or alternatively placed into, wells formed in the rock tailings. In either case, the two or more electrodes may pass a current between the electrodes through the rock tailings and/or water to heat the rock tailings.

The rock tailings (e.g., particles of the rock tailings) may be relatively small in dimensions. In some embodiments, an average maximum cross-sectional dimension (e.g., an average diameter) of the rock tailings is less than or equal to 1 mm, less than or equal to 750 μm, less than or equal to 500 μm, less than or equal to 250 μm, or other appropriate dimension. In some embodiments, an average maximum cross-sectional dimension of the rock tailings is greater than or equal to 50 μm, greater than or equal to 100 μm, greater than or equal to 250 μm, greater than or equal to 500 μm, greater than or equal to 750 μm, or greater than or equal to 1 mm. Combinations of the foregoing range are also possible (e.g., less than or equal to 1 mm and greater than or equal to 50 μm). Other ranges are possible.

In some embodiments, rock tailings may exhibit a relatively large porosity which may facilitate their use in generating hydrogen. For example, an average porosity of the rock tailings may be greater than or equal to 50%. The average porosity may also be less than or equal to 10%. Combinations of the forgoing are contemplated including a porosity between or equal to 10% and 50%. Of course, other porosities are also possible.

Turning to the figures, specific non-limiting embodiments are described in further detail. It should be understood that the various systems, components, features, and methods described relative to these embodiments may be used either individually and/or in any desired combination as the disclosure is not limited to only the specific embodiments described herein.

Figure 1B:
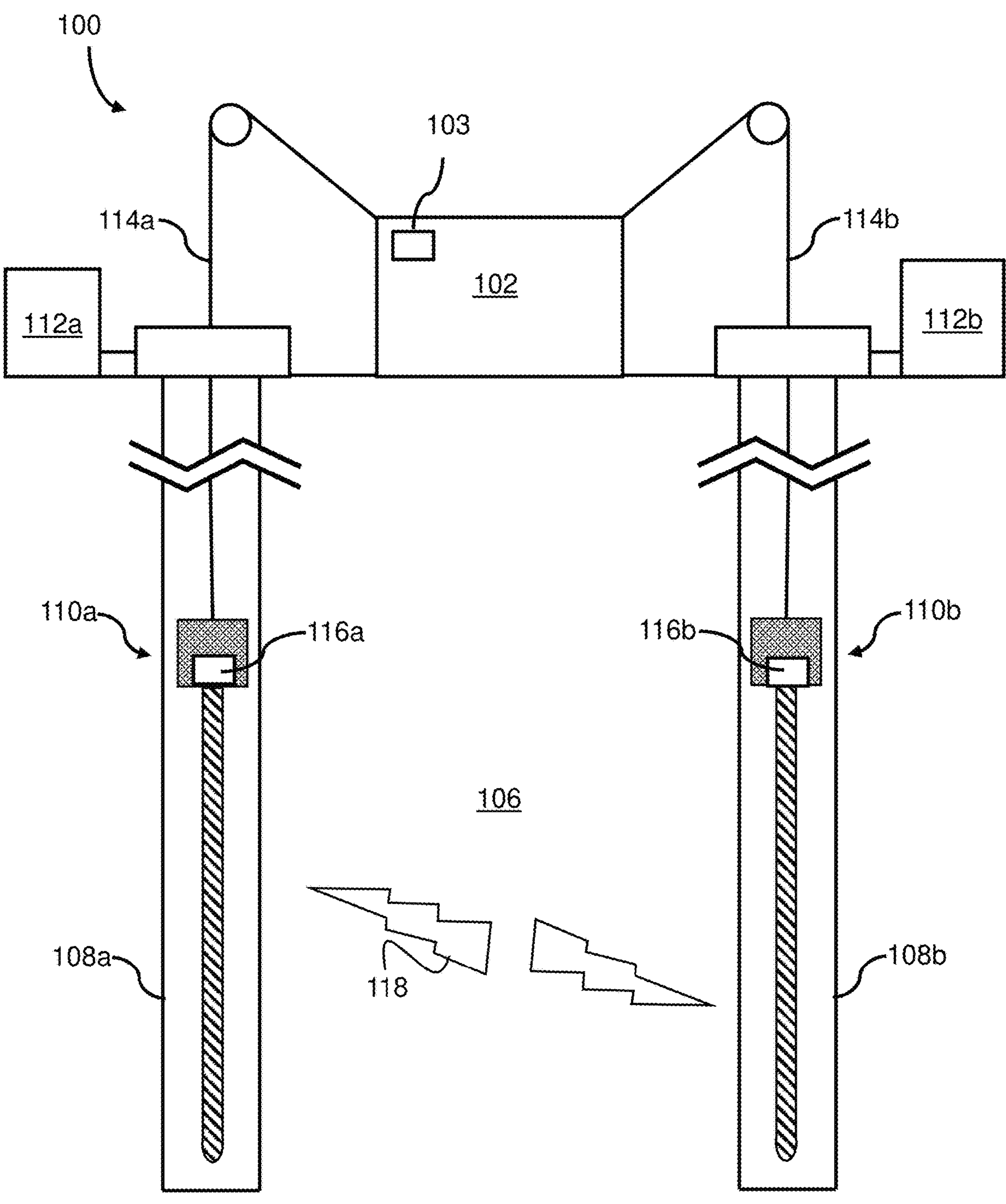
Figure 1C:
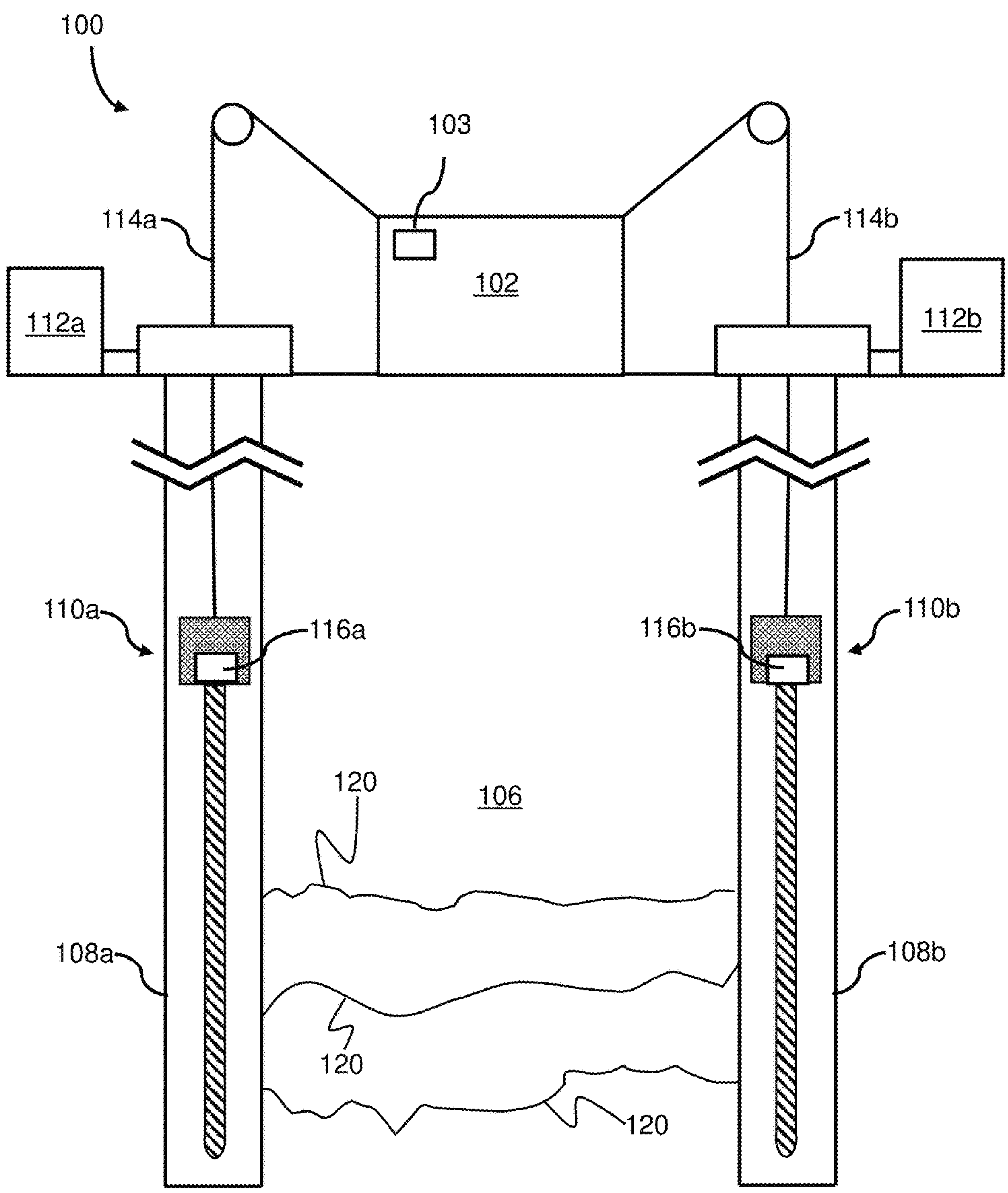

FIGS. 1A-1C schematically depict an embodiment of a system that may be used to store energy within a rock formation, for example, a subterranean formation 106. Of course, it should be understood that an overall system used to implement any of the methods disclosed herein may be implemented using two or more electrodes which may either correspond to the system depicted in FIGS. 1A-1C and/or may correspond to any appropriate type of electrodes as the disclosure is not limited in this fashion. In either case, starting with FIG. 1A, the depicted system 100 includes a surface power source 102 coupled to two or more downhole tools 110*a* and 110*b*, which are depicted as electrodes disposed on a distal end portion of the cable or drill string, disposed within separate wells 108*a* and 108*b*, which may also be referred to as boreholes herein. The power source 102 is connected to the two downhole tools 110*a* and 110*b* by separate high voltage cables 114*a* and 114*b*, or other electrical conductors, that are configured to transmit power (e.g., direct current, alternating current, pulsed power) from the power source to the downhole tools to perform the noted electrohydraulic fracturing and/or energy storage. During operation, the power source 102 may be electrically connected to the depicted two or more electrodes 110*a* and 110*b* disposed in two or more wells 108*a* and 108*b*, or any other appropriate number of electrodes and wells, to permit the passage of current between the two electrodes through a formation as elaborated on further below. Additionally or alternatively, and as noted above, the depicted system may also be used provide and/or maintain the subterranean formation 106 within a predetermined temperature range greater than or equal to 0° C. (e.g., 250° C.), which can facilitate the activation of a redox-active species (e.g., $Fe^{2+}$) within the rock formation and/or reaction of the redox-active species with a fluid (e.g., water). The well used to extract hydrogen may either be a separate well, or it may be one or more of the depicted wells including electrodes disposed therein.

To facilitate the injection of fluids (e.g., fracturing fluids, transport fluids, water), such as a fracturing fluid and/or proppant, and/or the injection of water into the formation, the system may include one or more pumps 112*a* and 112*b* configured to pump a desired liquid, such as the noted fracturing fluid, proppant, chelating agent, and/or water, into the wells 108*a* and 108*b* and correspondingly into the formation 106. Appropriate reservoirs for these different fluids may be fluidly coupled to the one or more pumps 112*a* and 112*b*.

In some embodiments, the system 100 also includes at least one processor 103 with associated non-transitory computer readable memory. In some embodiments, the system 100 may also include one or more sensors, such as the sensors 116*a* and 116*b* disposed down hole on the downhole tools 110*a* and 110*b*, configured to sense one or more parameters (e.g., temperature, gas composition, pressure, or other appropriate parameter) related to the formation 106. The one or more sensors 116*a* and 116*b* may be configured to transmit signals related to the one or more sensed parameters, such as temperature from a temperature sensor in some embodiments, to the one or more processors for performing any of the methods disclosed herein. The non-transitory computer readable memory may include processor executable instructions that when executed cause the at least one processor 103 to control the system 100 shown in FIGS. 1A-1C to perform any of the methods described herein or other suitable methods for generating and/or extracting geologic hydrogen. For example, the processor 103 may be configured to control the power transmitted to either or both of the depicted downhole tools 110*a* and 110*b*. Other functions of the at least one processor 103 are also possible.

While the above embodiment is primarily described relative to a subterranean formation, such a system may also be implemented to store energy in other rock formations. Also, the implementation of such a system with the electrodes, pump, and other structures associated with a reactor and/or tailings containing the desired hydrogen generating materials are also contemplated as also described herein. Thus, the depicted system should not be interpreted as only being used with subterranean formations.

As noted elsewhere herein, the two (or more) electrodes can be used to electrically stimulate a redox-active species of the rock formation. By way of illustration, FIG. 1B schematically illustrates electrical stimulation 118 of the formation 106. When larger voltage potentials are applied, the electrical stimulation of the rock formation fractures the formation to increase the volume and/or surface area of the rock formation. For example, in FIG. 1C, fractures 120 have formed as a result of the applied electrical stimulation. Alternatively or additionally, when lower electrical potentials are applied in an appropriate potential range, the electrical stimulation may activate a redox-active species (e.g., reduces the species, alters an oxidation state of the species), iron, as an example. In some embodiments, a combination of a series of electrical stimulations can be used to both fracture the rock formation and to alter a redox state of species within the rock formation. For example, in some such embodiments, a first electrical potential is applied across the rock formation to fracture the rock formation and then a second electrical potential (lower than the first electrical potential) is applied across the rock formation to alter a redox state of the species within the rock formation. It should be understood that the second potential may be selected to facilitate the desired redox reaction depending on the composition of the specific rock formation in which energy is to be stored. Of course, in some such embodiments, additional electrical potentials (e.g., a third electrical potential, a fourth electrical potential) can be applied across the rock formation, and those skilled in the art, in view of this disclosure, will be capable of selecting the appropriate number and magnitude of applied potentials to the rock formation.

Figure 2:
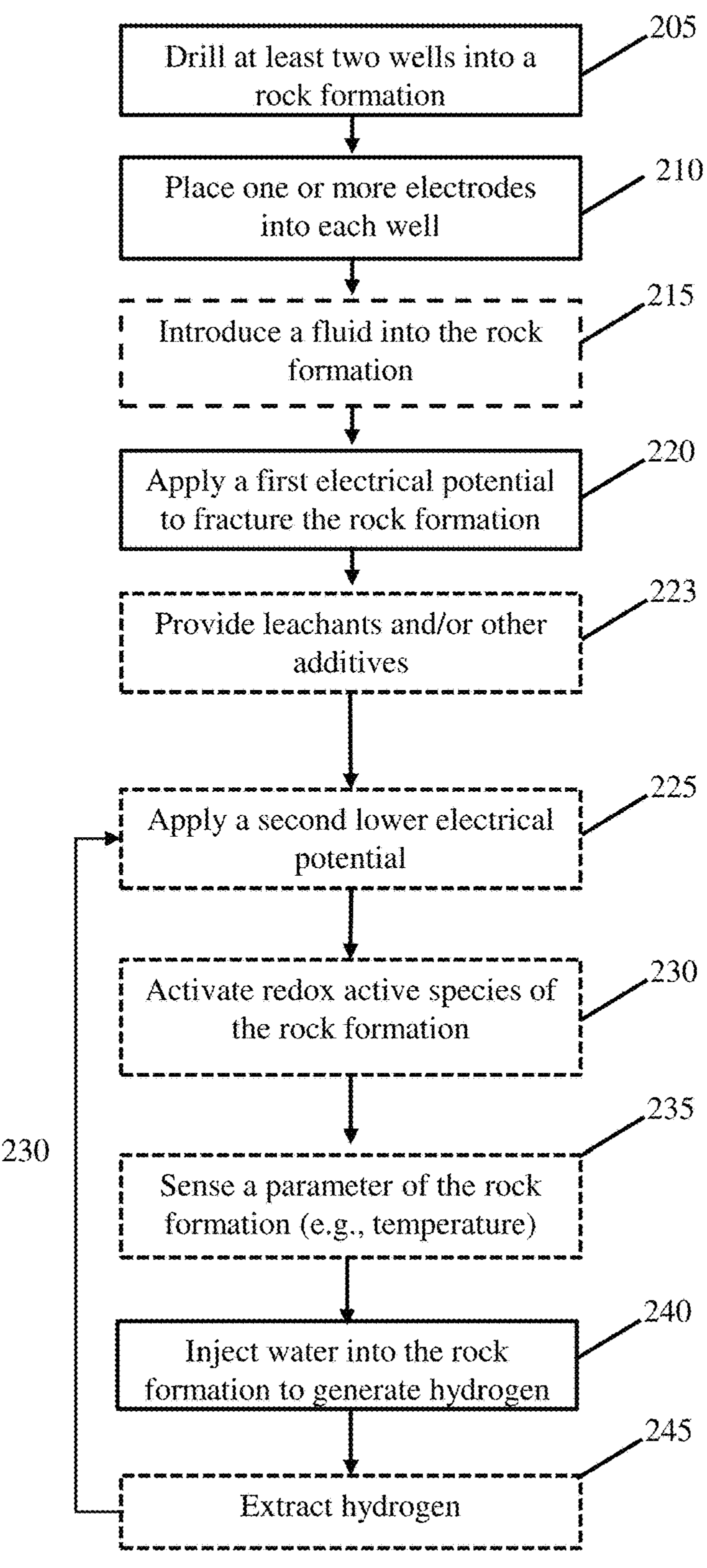
FIG. 2 is a flow chart depicting a process for storing energy in a rock formation, according to some embodiments.

FIG. 2 presents a schematic flow diagram illustrating a process for extracting a resource from a rock formation. At least two wells are drilled into the rock formation (e.g., a subterranean rock formation) (205), which may directly store energy or store energy when water is exposed to the formation at appropriate temperatures and/or pressures. One or more electrodes may be placed into each of the wells (210), and an electrical potential is applied between the electrodes (220) causing a current to pass between the electrodes through the rock formation itself, or a fluid, if present, within the rock formation. Additionally, fluid may be introduced into the rock formation through one or more of the wells at (215), as mentioned above. This fluid may be a hydraulic fracturing fluid including appropriate additives and/or proppants. In some embodiments, the fluid may include liquid water. A first electrical potential is applied to the rock formation directly or to a fluid within the rock formation to fracture the rock formation (220). Specifically, rapid temperature changes (upon heating and/or cooling of the rock formation), formation of a shockwave, and/or expansion of the fluid and/or the formation during the electrohydraulic fracturing process may lead to increased, or additional, fracturing of the subterranean formation. In some embodiments, an injected fluid may contain an additive, such as a leaching agent to abstract a species (e.g., $Fe^{2+}$, $Fe^{3+}$) into the fluid, for example, by dissolving the species. Leaching agents as fluid additives (e.g., acids, chelating agents) are described elsewhere herein. For example, in FIG. 2, leachants and/or other additives may be added (223). In some such embodiments, the leachants and/or other additive may facilitate a liquid state (e.g., aqueous state) reaction, rather than a solid state reaction. In some embodiments, a second lower electrical potential is applied across the rock formation (225). In some embodiments, the second electrical potential is appropriate to activate a redox species within the rock formation (230).

During application of the second electrical potential to change a redox state of a desired species in the rock formation, the voltage (i.e., potential difference) may be sufficient to change the redox state of the species. In some embodiments, the first electrical potential is of a greater potential than the second electrical potential. In some embodiments, the first electrical potential fractures a rock formation, and the second electrical potential alters a redox state of a species of the rock formation which may occur either as a solid state reaction and/or within an aqueous liquid the species is dissolved in within the rock formation. However, in other embodiments, a single applied electrical potential fractures the rock formation and alters a redox state of a species within the rock formation.

In some embodiments, the second electrical potential is greater than or equal to 0.1 V, greater than or equal to 0.3 V, greater than or equal to 0.5 V, greater than or equal to 0.7 V, greater than or equal to 1.0 V, greater than or equal to 1.5 V, greater than or equal to 2.0 V, greater than or equal to 2.5 V, greater than or equal to 3.0 V, greater than or equal to 3.5 V, greater than or equal to 4.0 V, greater than or equal to 4.5 V, greater than or equal to 5.0 V, greater than or equal to 7.0 V, or greater than or equal to 10. V. In some embodiments, the second electrical potential is less than or equal to 10.0 V, less than or equal to 7.0 V, less than or equal to 5.0 V, less than or equal to 4.5 V, less than or equal to 4.0 V, less than or equal to 3.5 V, less than or equal to 3.0 V, less than or equal to 2.5 V, less than or equal to 2.0 V, less than or equal to 1.5 V, less than or equal to 1.0 V, less than or equal to 0.7 V, less than or equal to 0.5 V, less than or equal to 0.3 V, or less than or equal to 0.1 V. Combinations of the foregoing range are possible (e.g., greater than or equal to 0.1 V and less than or equal to 5.0 V). Other ranges are possible as this disclosure is not so limited. It should be understood that depending on the species within the rock formation (e.g., $Fe^{2+}$, $Fe^{3+}$), the second voltage may be adjusted appropriately to change the redox state of the species, and those skilled in the art, in view of this disclosure, will be capable of doing so.

As previously noted, in some embodiments, it may be desirable to control a temperature of the rock formation (e.g., a subterranean rock formation). In such an embodiment, a temperature, or other parameter related to the formation of a resource (e.g., hydrogen) from the rock formation may be sensed by one or more sensors positioned downhole within a well (e.g., within a rock formation capable of generating and/or releasing geologic hydrogen). The one or more sensors may either be separate from or connected to the downhole electrodes used to apply electrical potentials to the rock formation. In either case, the one or more sensors may be used to sense one or more parameters (235). Appropriate parameters may include, but are not limited to temperature, pressure, gas composition, and/or other appropriate parameters. The operation of the two or more electrodes may then be controlled based on the sensed one or more parameters at (240). For example, in instances where it is desirable to control a temperature of the subterranean formation, the current, electrical potential, power, or other operating parameter applied by the two or more electrodes may be controlled to maintain a temperature of the subterranean formation to be within a predetermined range of temperatures. Two (or more) electrodes can be used to continuously dissipate electric energy as heat (i.e., via Joule heating) through the rock formations and/or fluid within the pores of the rock formation. In some such embodiments, both DC and AC (or a combined DC/AC) stimulation may be used. The electric current can heat the reservoir with power proportional to both voltage and current.

After electrohydraulic fracturing, activation of a redox-active species of the rock formation, and optional temperature control of the rock formation, water can be injected into the rock formation (240), which may react with the activated species of the rock formation to generate a resource, such as hydrogen. The resource may optionally be extracted from the rock formation (245), which may include the extraction of pressurized gas from one or more wells, the pumping of fluid out of one or more wells with the resource (e.g., $H_2$) dissolved therein, and/or using any other appropriate extraction method for extracting the resource from within the rock formation. In some instances, extracting the resource may include injecting a fluid, such as water and/or a fracturing fluid, into the rock formation to either enhance the generation of the resource and/or the extraction of the resource from the subterranean formation. However, in some embodiments, the resource can be left within the rock formation to store the energy of the activated redox species within the rock formation.

Figure 3A:
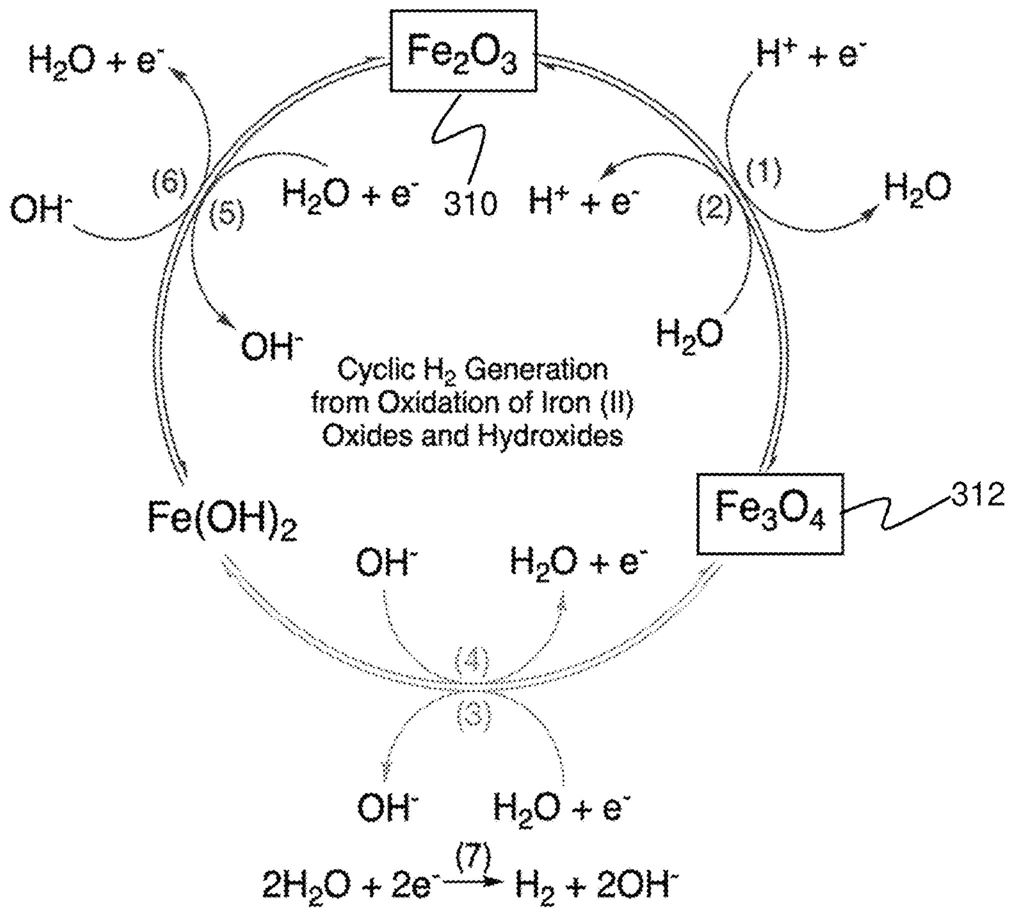
FIG. 3A depicts an example of a solid-state redox cycle between Fe(III), Fe(II,III), and Fe(II) iron minerals, according to some embodiments.
Figure 3B:
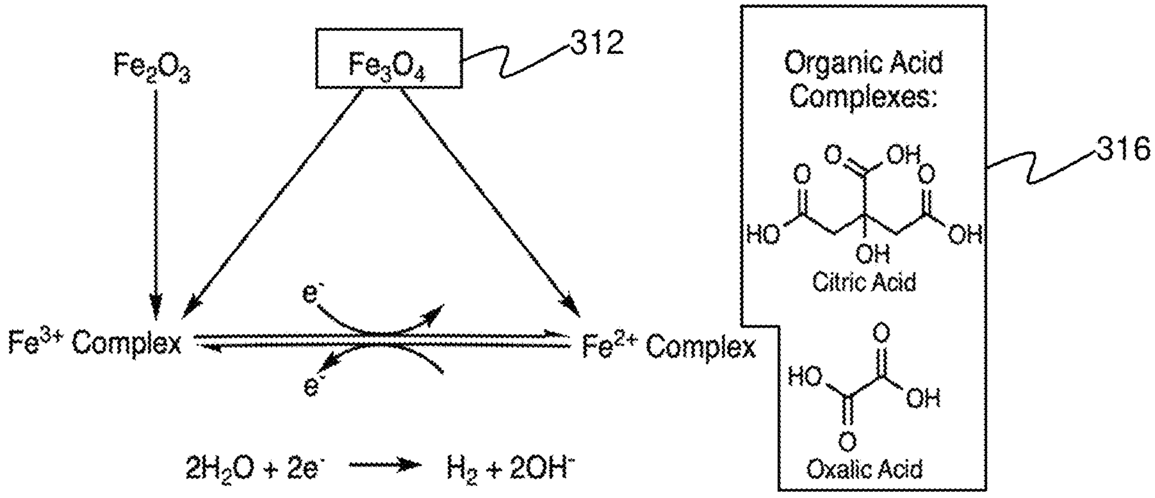
FIG. 3B depicts an iron redox cycle within an aqueous state, facilitated by citric acid and/or oxalic acid, according to some embodiments.
Figures 4A, 4B, 4C, 4D:
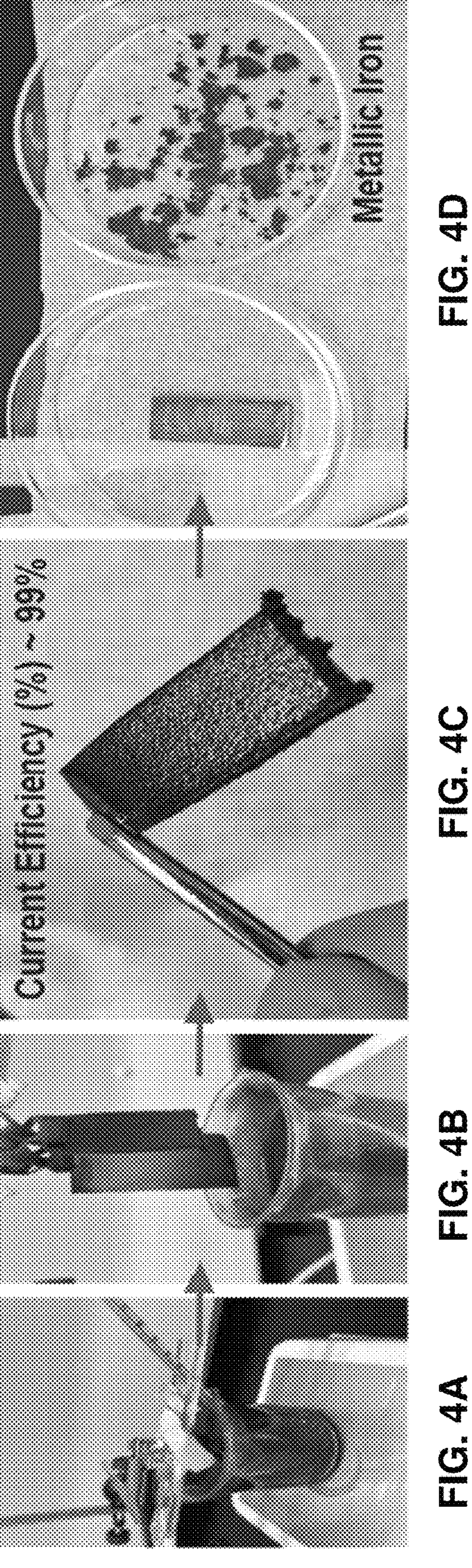
FIGS. 4A-4D depicts an experimental setup configured for use in applying an electrical potential across a rock sample with an iron species to alter a redox state of the iron species, according to some embodiments.

FIGS. 3A-3B show exemplary chemical processes that may store energy within a rock formation. For example, FIG. 3A, the cyclic generation of $H_2$ starting from $Fe^{2+}$ and water is shown. In the figure, species 310 comprises redox-active $Fe^{3+}$, when under it goes electrical stimulation (not shown) to form the activated species 312. The activated species 312 can then react with water, as shown in the figure.

FIG. 3B illustrates an aqueous-mediated process for storing energy. In such an embodiment, the activated species 312 can be extracted into aqueous solution via one or more additives (e.g., chelating agents), such as additives 316.

Examples: Laboratory Scale Studies

According to some exemplary embodiments, the inventors have conducted experiments to show that an electrical potential applied across a rock formation with an iron species alters a redox state of the iron species, which may then be reacted with water to generate hydrogen. In particular, FIGS. 4A-4D shows an exemplary experimental setup including a beaker with electrodes (one anode and one cathode) extending into the beaker (see FIG. 4A). The cathode was constructed of stainless steel while the anode was constructed of nickel, and the electrodes were placed in an alkaline NaOH medium. The beaker was filled with a hematite rock slurry solution and electrical stimulation was applied via the electrodes. Following electrical stimulation, hematite was plated onto the electrodes as dendritic reduced iron, which was scraped from the electrode as metallic iron (see FIGS. 4B, 4C, and 4D). The dendritic material was then analyzed using powdered x-ray diffraction ("XRD") to confirm the alteration of the redox state in the iron species.

Figure 5:
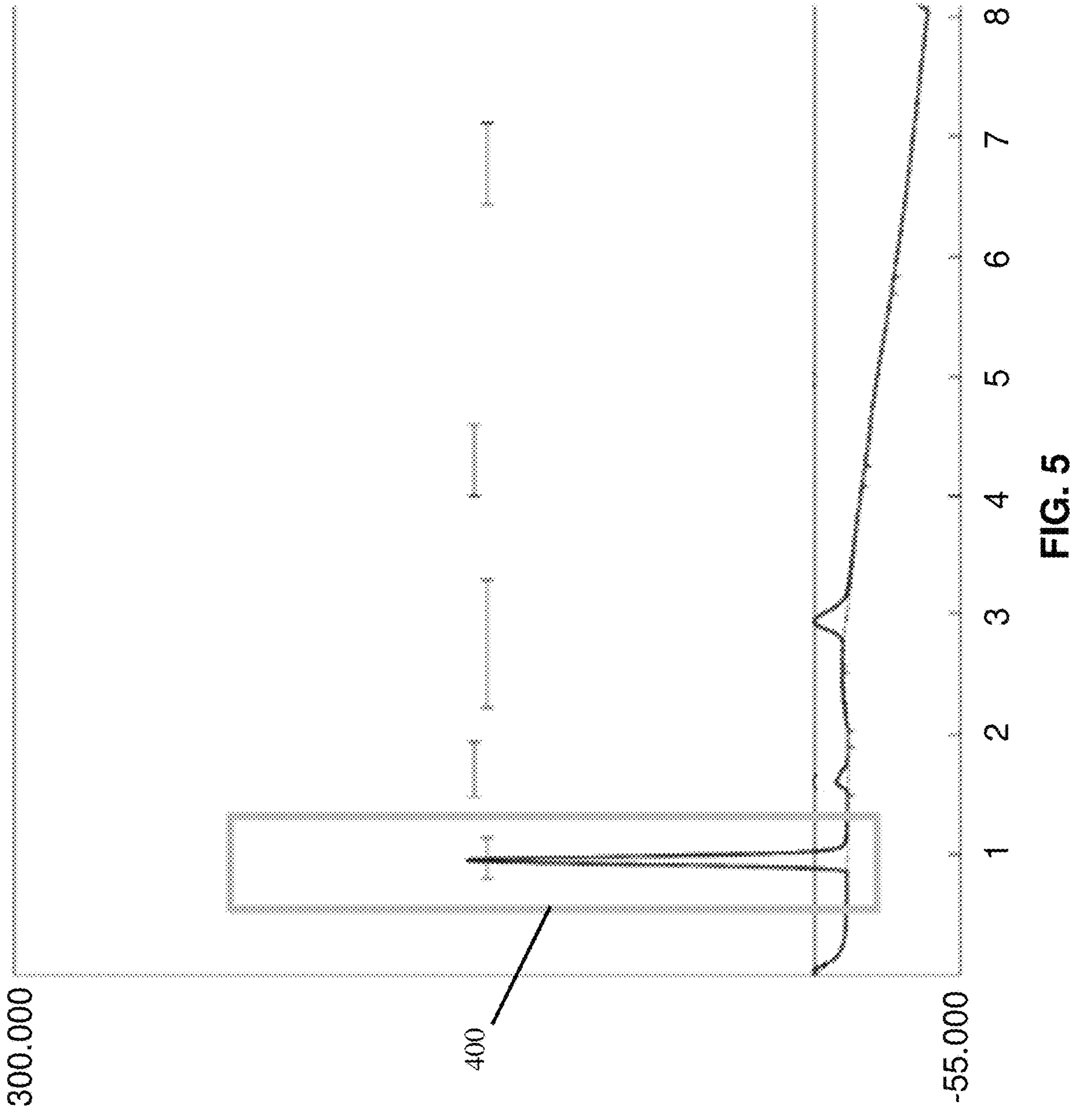
FIG. 5 is a graph depicting gas chromatography results and specifically showing produced hydrogen for an exemplary experiment, according to some embodiments.

The inventors also conducted experiments to quantify hydrogen generation using the reduced iron species as referenced above. In particular, the reduced iron was combined with deionized water in a first vial, and a second control vial containing deionized water was prepared. The atmosphere surrounding the first and second vials was then purged with Argon gas to create an inert environment. The first and second vials were then placed into an oven at 80° C. to facilitate the hydrogen generating reaction. The hydrogen production was monitored using gas chromatography with samples taken at intervals of 5 days, 10 days, and 20 days. A sample of the control vial was also analyzed at 10 days. FIG. 5 shows the data collected from the hydrogen production monitoring, and more specifically FIG. 5 is a chart showing the gas chromatography results with the peak hydrogen concentration indicated by reference numeral 400. As shown in FIG. 5, the control vial containing only deionized water did not yield any hydrogen, showing that hydrogen produced in the first vial was as a result of the deionized water reacting with the reduced iron. The hydrogen production results were compiled in Table 1 below. Table 1 shows the concentration of hydrogen in units of micromolar per grams of iron (μM H2/g Fe) as well as showing the amount of hydrogen produced measured in millimoles per grams of iron (mmol H2/g Fe), with these results being shown for the first vial at 5 days, 10 days, and 20 days, and the second control vial at 10 days. As shown in Table 1, the concentration and amount of produced hydrogen increased with each sampling interval while the control vial did not result in any hydrogen production.

TABLE 1

| Sample and Ratio | μM $H_2$/g Fe | mmol $H_2$/g Fe |
|---|---|---|
| 1:100 - Day 5 | 18.84 | 131.9 |
| 1:100 - Day 10 | 59.99 | 420.0 |
| 1:100 - Day 20 | 87.07 | 609.5 |
| DI Control - Day 10 | 0 | 0 |

While several embodiments of the present disclosure have been described and illustrated herein, those of ordinary skill in the art will readily envision a variety of other means and/or structures for performing the functions and/or obtaining the results and/or one or more of the advantages described herein, and each of such variations and/or modifications is deemed to be within the scope of the present disclosure. More generally, those skilled in the art will readily appreciate that all parameters, dimensions, materials, and configurations described herein are meant to be exemplary and that the actual parameters, dimensions, materials, and/or configurations will depend upon the specific application or applications for which the teachings of the present disclosure is/are used. Those skilled in the art will recognize or be able to ascertain using no more than routine experimentation, many equivalents to the specific embodiments of the invention described herein. It is, therefore, to be understood that the foregoing embodiments are presented by way of example only and that, within the scope of the appended claims and equivalents thereto, the invention may be practiced otherwise than as specifically described and claimed. The present disclosure is directed to each individual feature, system, article, material, and/or method described herein. In addition, any combination of two or more such features, systems, articles, materials, and/or methods, if such features, systems, articles, materials, and/or methods are not mutually inconsistent, is included within the scope of the present disclosure.

The indefinite articles “a” and “an,” as used herein in the specification and in the claims, unless clearly indicated to the contrary, should be understood to mean “at least one.”

The phrase “and/or,” as used herein in the specification and in the claims, should be understood to mean “either or both” of the elements so conjoined, i.e., elements that are conjunctively present in some cases and disjunctively present in other cases. Other elements may optionally be present other than the elements specifically identified by the “and/or” clause, whether related or unrelated to those elements specifically identified unless clearly indicated to the contrary. Thus, as a non-limiting example, a reference to “A and/or B,” when used in conjunction with open-ended language such as “comprising” can refer, in one embodiment, to A without B (optionally including elements other than B); in another embodiment, to B without A (optionally including elements other than A); in yet another embodiment, to both A and B (optionally including other elements); etc.

As used herein in the specification and in the claims, “or” should be understood to have the same meaning as “and/or” as defined above. For example, when separating items in a list, “or” or “and/or” shall be interpreted as being inclusive, i.e., the inclusion of at least one, but also including more than one, of a number or list of elements, and, optionally, additional unlisted items. Only terms clearly indicated to the contrary, such as “only one of” or “exactly one of,” or, when used in the claims, “consisting of,” will refer to the inclusion of exactly one element of a number or list of elements. In general, the term “or” as used herein shall only be interpreted as indicating exclusive alternatives (i.e. “one or the other but not both”) when preceded by terms of exclusivity, such as “either,” “one of,” “only one of,” or “exactly one of.” “Consisting essentially of,” when used in the claims, shall have its ordinary meaning as used in the field of patent law.

As used herein in the specification and in the claims, the phrase “at least one,” in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase “at least one” refers, whether related or unrelated to those elements specifically identified. Thus, as a non-limiting example, “at least one of A and B” (or, equivalently, “at least one of A or B,” or, equivalently “at least one of A and/or B”) can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

Some embodiments may be embodied as a method, of which various examples have been described. The acts performed as part of the methods may be ordered in any suitable way. Accordingly, embodiments may be constructed in which acts are performed in an order different than illustrated, which may include different (e.g., more or less) acts than those that are described, and/or that may involve performing some acts simultaneously, even though the acts are shown as being performed sequentially in the embodiments specifically described above.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

In the claims, as well as in the specification above, all transitional phrases such as "comprising," "including," "carrying," "having," "containing," "involving," "holding," and the like are to be understood to be open-ended, i.e., to mean including but not limited to. Only the transitional phrases "consisting of" and "consisting essentially of" shall be closed or semi-closed transitional phrases, respectively, as set forth in the United States Patent Office Manual of Patent Examining Procedures, Section 2111.03.

The invention claimed is:

1. A method for storing energy in a rock formation via oxidation-reduction reactions, the method comprising:

applying a first electrical potential across the rock formation; and altering a redox state of a species within the rock formation in response to the first electrical potential, wherein the species comprises iron, zinc, and/or aluminum.

2. The method of claim 1, further comprising injecting water into the rock formation.

3. The method of claim 1, further comprising reacting water with the species of the rock formation.

4. The method of claim 1, further comprising applying a second electrical potential across the rock formation, different from the first electrical potential, prior to applying the first electrical potential across the rock formation, wherein applying the second electrical potential fractures at least a portion of the rock formation.

5. The method of claim 4, wherein the second potential is greater than the first potential.

6. The method of claim 1, wherein the first electrical potential is applied to a fluid within the rock formation.

7. The method of claim 6, wherein the first electrical potential is applied to a solid portion of the rock formation.

8. The method of claim 1, wherein applying the first electrical potential across the rock formation alters the redox state of the species within the rock formation from a first state to a second state, and further comprising reacting water with the species, wherein reacting changes the redox state of the species from the second state to the first state.

9. The method of claim 1, further comprising generating and/or extracting hydrogen.

10. The method of claim 1, wherein altering the redox state of the species comprises increasing an oxidation state of the species.

11. The method of claim 1, further comprising dissolving generated hydrogen in a fluid and flowing the fluid from the rock formation.

12. The method of claim 1, further comprising applying a second electrical potential, wherein a voltage of the second electrical potential is greater than or equal to 0.1 V and less than or equal to 5.0 V.

13. The method of claim 1, wherein altering the redox state of the species occurs in a solid state.

14. The method of claim 1, wherein altering the redox state of the species occurs in a liquid or aqueous state.

15. A method for storing energy in a rock formation via oxidation-reduction reactions, the method comprising:

applying a first electrical potential across the rock formation, the rock formation comprising an iron species;

altering a redox state of the iron species within the rock formation from a first state to a second state in response to the first electrical potential;

injecting water to the rock formation;

reacting the water with the iron species within the rock formation to generate hydrogen; and altering the redox state of the iron species within the rock formation from the second state to the first state in response to reacting the water with the iron species to generate the hydrogen.

16. The method of claim 15, wherein an amount of the hydrogen generated is greater than 0.0001 nanomoles $H_2$/gram rock.

17. The method of claim 15, further comprising applying a second electrical potential across the rock formation, different from the first electrical potential, prior to applying the first electrical potential across the rock formation, wherein applying the second electrical potential fractures at least a portion of the rock formation.

18. The method of claim 17, wherein the second potential is greater than the first potential.

19. The method of claim 15, wherein the first electrical potential is applied to a fluid within the rock formation.

20. The method of claim 19, wherein the first electrical potential is applied to a solid portion of the rock formation.

21. The method of claim 15, further comprising extracting the hydrogen.

22. The method of claim 15, wherein altering the redox state of the iron species comprises increasing an oxidation state of the iron species.

23. The method of claim 15, further comprising dissolving generated hydrogen in a fluid and flowing the fluid from the rock formation.

24. The method of claim 15, further comprising applying a second electrical potential, wherein a voltage of the second electrical potential is greater than or equal to 0.1 V and less than or equal to 5.0 V.

25. The method of claim 15, wherein altering the redox state of the iron species occurs in a solid state.

26. The method of claim 15, wherein altering the redox state of the iron species occurs in a liquid or aqueous state.

27. A system comprising:

a power source;

at least two electrodes connected to the power source;

at least one pump; and at least one processor configured to operate the power source and the at least one pump to perform the method of claim 2, the at least one pump being configured to inject the water into the rock formation.

28. The system of claim 27, wherein the at least two electrodes are configured to transmit electrical energy to a surrounding rock formation.

29. The system of claim 28, wherein the rock formation comprises at least one of peridotite, iron-rich rock, olivine-rich rock, mafic rock, ultramafic rock, skarn, an iron-rich metasomatic rock, or a layered mafic intrusion.

* * * * *